No. 626,808. Patented June 13, 1899.
J. B. GURNEY.
COVER FOR COOKING UTENSILS.
(Application filed July 29, 1898.)
(No Model.)
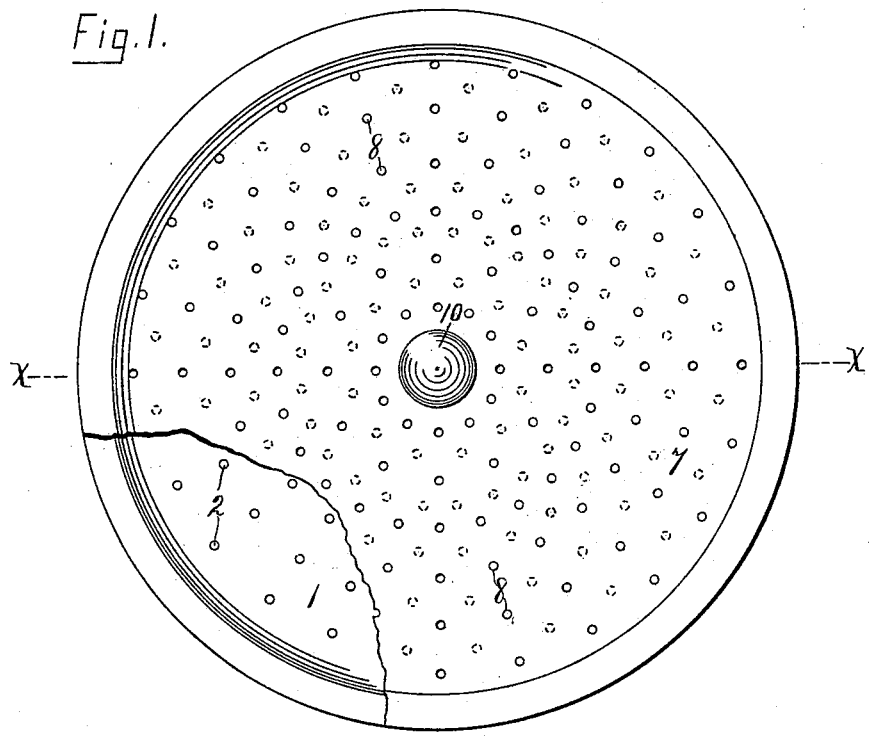
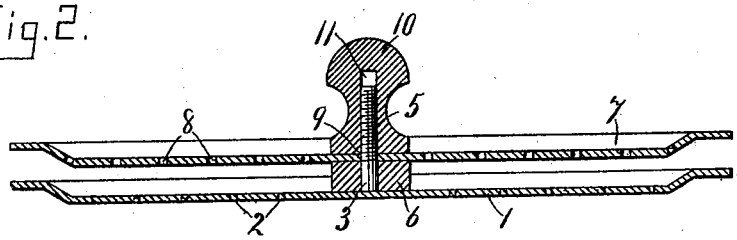
WITNESSES:
INVENTOR
James B. Gurney
BY Rufus King
ATTORNEY.
THE NORRIS PETERS CO., PHOTO-LITHO., WASHINGTON, D. C.

United States Patent Office.

JAMES BOUGHTON GURNEY, OF EAST SETAUKET, NEW YORK.

COVER FOR COOKING UTENSILS.

SPECIFICATION forming part of Letters Patent No. 626,808, dated June 13, 1899.

Application filed July 29, 1898. Serial No. 687,194. (No model.)

*To all whom it may concern:*

Be it known that I, JAMES BOUGHTON GURNEY, a citizen of the United States, and a resident of East Setauket, county of Suffolk, and State of New York, have invented certain new and useful Improvements in Covers for Cooking Utensils, of which the following is a specification, reference being had to the accompanying drawings, forming a part thereof, in which similar numerals of reference indicate corresponding parts.

This invention relates to an improvement in covers for cooking utensils; and the object thereof is to provide a device whereby the steam generated in the process of cooking may be allowed to escape, while the fat is prevented from flying in an upward direction and falling upon the stove.

Heretofore the spattering of the fat over the stove has been a source of endless annoyance to housekeepers and cooks. This is particularly the case when broiling or frying meat or frying other articles of food in heated fat. To prevent this, it has been the custom sometimes for cooks to place an ordinary tin plate over the cooking food, which effectually prevents the spattering of the fat, but at the same time serves to retain the steam within the utensil, thereby preventing the food from browning in the desired manner.

The invention will be hereinafter fully described, and specifically set forth in the annexed claim.

In the accompanying drawings, Figure 1 is a plan view of the device in its preferred form, a portion of the upper plate being broken away; and Fig. 2 is a sectional view on the line $x$ $x$ of Fig. 1.

In the practice of my invention I employ a metallic plate 1 of the desired size and shape to fit over the utensil in which the food is to be cooked. This plate preferably has a depressed central portion, and this depressed central portion has a series of perforations 2, adapted to permit the passage of steam. Projected upwardly from the center of this plate is a spindle 3, which is fixed permanently to said plate. This spindle is provided with a thread 5, cut thereon. A collar 6, preferably of wood, is adapted to fit over the spindle. A secondary plate 7, preferably formed in the same manner as the lower plate 1, is provided with a series of perforations 8, these perforations being so arranged in concentric circles that said circles are in staggered relation to the circles of perforations 2 in the lower plate. A hole 9, centrally located in the plate 7, is adapted to receive the end of the spindle projecting above the collar 6. A knob 10, preferably of wood or some other non-heat-conducting material, is provided with a central hole 11, which has a thread cut therein adapted to fit the thread 5 of the spindle. The collar 6 is first placed over the spindle, the upper plate 7 then placed in position, and the knob screwed down upon the top of the upper plate, care being taken that the perforations of the upper plate and the perforations of the lower plate are radially in staggered relation to each other. It will readily be seen that when placed in position over the cooking utensil the steam will find ready passage through the perforations of the lower plate and thence through the perforations of the upper plate, while any fat which might fly upward through the perforations of the lower plate will strike the solid portion of the upper plate and be held between the two. Its trajectory could not pass through adjacent perforations in the lower and upper plates.

The device may be easily cleaned by unscrewing the knob and removing the upper plate.

It is obvious that any form of plate may be used and any number of perforations may be made in the two plates of the device and obvious, too, that mechanical means may be used to insure the staggered relation of the perforations when the device is assembled; but this is not considered necessary at the present time.

Having thus described my invention, what I claim as new, and desire to secure by Letters Patent, is—

An improved cover for cooking utensils embodying a perforated plate, a spindle mounted thereon, a collar surrounding said spindle and resting upon said perforated plate, a secondary perforated plate supported by said collar, and a knob adapted to be screwed upon the spindle and engage the secondary plate, substantially as shown and described.

In testimony that I claim the foregoing as my invention I have signed my name, in presence of two witnesses, this 27th day of July, 1898.

JAMES BOUGHTON GURNEY.

Witnesses:
SYDNEY D. PRESCOTT,
C. P. COLTON.